United States Patent [19]

Marchildon

[11] 4,413,661
[45] Nov. 8, 1983

[54] BOOM MOUNT

[75] Inventor: Jacques Marchildon, Amos, Canada

[73] Assignee: Harricana Metal Inc., Amos, Canada

[21] Appl. No.: 278,987

[22] Filed: Jun. 30, 1981

[30] Foreign Application Priority Data

Apr. 7, 1981 [CA] Canada .................................. 374888

[51] Int. Cl.³ ............................................ A01G 23/08
[52] U.S. Cl. ..................................... 144/2 Z; 52/721;
414/718; 144/343
[58] Field of Search ............... 414/705, 690, 692, 718;
144/2 Z, 3 D, 343; 52/721, 115–118, 726, 758 N

[56] References Cited

U.S. PATENT DOCUMENTS 3,977,148  8/1976  Ranini .................................. 414/718

Primary Examiner—W. D. Bray
Attorney, Agent, or Firm—Stanley E. Johnson; Richard J. Hicks

[57] ABSTRACT

A mobile tree processor of the type having a boom reciprocally mounted in a box section and stripper type delimber means associated therewith and means mounting the boom on the vehicle whereby the boom can be raised and lowered while it remains horizontal to respective operative and transport positions. The box section of the boom is pivotally connected to a lever and associated with such pivotal connection is a lock means preventing pivotal movement of the boom thereon when the boom is in its raised position.

6 Claims, 6 Drawing Figures

BOOM MOUNT

This invention relates to a mobile tree processor and more particularly to improvements in the mounting of the boom to improve mobility of the machine.

In the prior art there are numerous machines for processing and/or harvesting trees wherein a stripper delimber is mounted on the boom and/or mounting for the boom and limbs are removed from trees by reciprocal movement of either the boom or delimber. Tree harvesters include tree severing means for felling standing trees and while the invention herein is used in reference to a tree processing machine it is equally applicable to tree harvesters of the same general type. Examples of the prior art may be found in Canadian Pat. Nos. 920,482 issued Feb. 6, 1973, 1,011,625 issued June 7, 1977, 869,331 issued Apr. 27, 1971, 1,055,366 issued May 29, 1979 and U.S. Pat. No. 3,183,952 issued May 18, 1965.

In the foregoing prior art devices, a mast is mounted on an articulated boom, as for example disclosed in Canadian Pat. Nos. 920,482 and 1,055,366. A boom is reciprocally mounted in a box section, pivotally attached to the vehicle. In some of the prior art devices, the tree being processed is located above the boom while in others it is below the boom during processing. In all cases, however, the boom and its pivotal attachment to the vehicle lie in a common vertical plane thus limiting the amount the boom can be raised and lowered.

A principal object of the present invention is to provide a boom mounting wherein the boom is off-set from the mounting means and including an additional coupling whereby the boom can be raised for normal operation and lowered into a transport position, the latter reducing the over-all height of the vehicle facilitating movement from one location to another.

In accordance with the present invention there is provided a tree processor comprising a mobile vehicle, a boom reciprocally mounted in a box section and having a stripper type delimber associated therewith for removing limbs from trees and means mounting the box section on said vehicle, said means comprising a lever pivotally attached at first and second positions respectively to said vehicle and said box section for movement about respective first and second parallel axes, so that the boom can be raised and lowered to respective operative and transport positions while the boom remains in a horizontal position, lock means associated with said pivotal attachment at said second position preventing pivotal movement of the boom on the lever when said boom is in its raised operative position, said boom being laterally off-set with respect to said first position and power means for pivoting said lever about said first axis.

The invention is illustrated by way of example in the accompanying drawings wherein.

Figure 6:
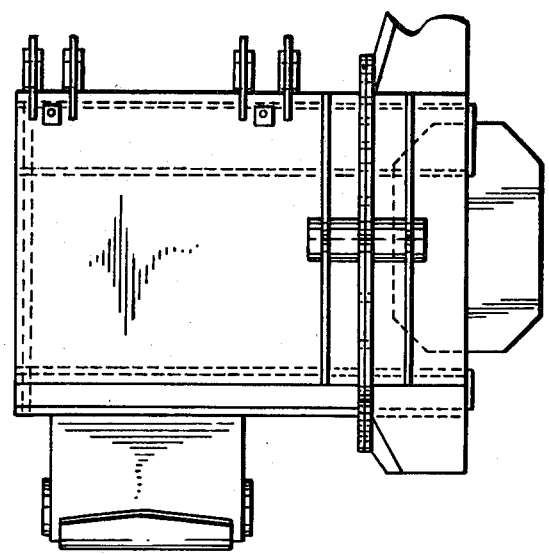
Figure 2:
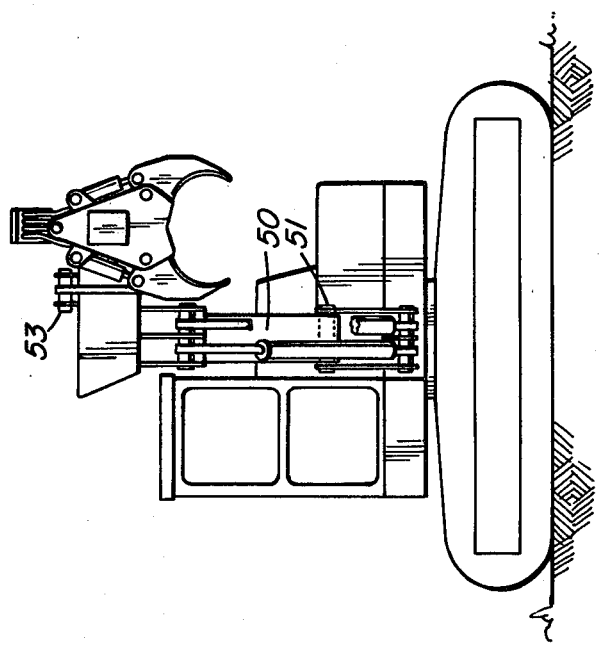
FIG. 2 is an end elevational view of FIG. 1.
Figure 5:
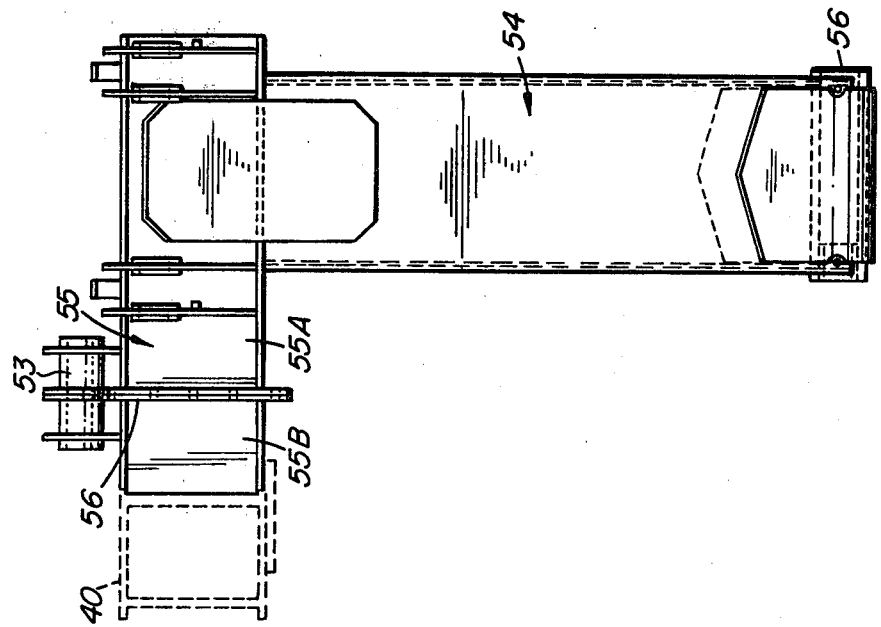
FIG. 5 is a right-hand side elevational view of FIG. 4.
Figure 4:
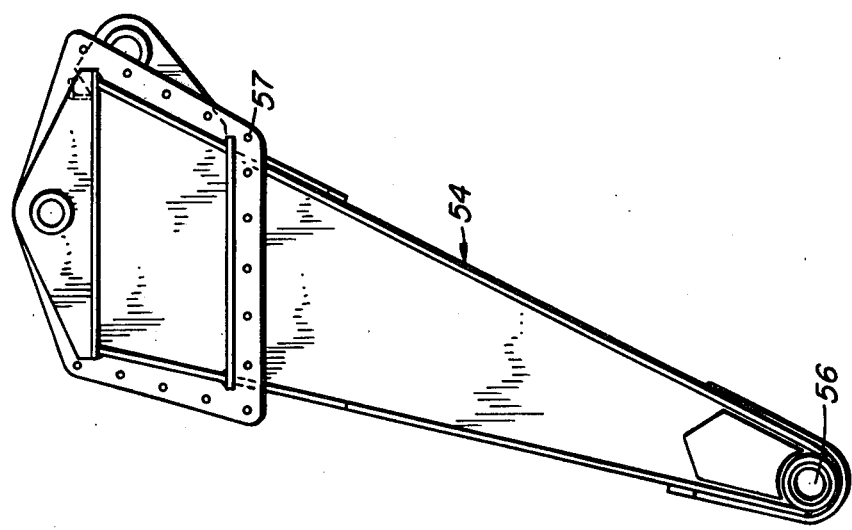
FIG. 4 is an elevational view of the lever arm for mounting the boom on the vehicle.

FIG. 6, appearing on the same sheet as FIG. 2, is a top plan view of the lever arm illustrated in FIGS. 4 and 5.

Referring in detail to the drawings, there is illustrated a tree processor comprising a mobile base unit 10 on which there is pivotally mounted a power and table unit 20 for slewing about a vertical axis. A boom 30 is reciprocally mounted in a box section 40 and the latter is supported on the turntable 20 by a lever 50 pivotally connected to the turntable by a pivot pin 51. The boom can be pivoted about pivot 51 by hydraulic cylinder means 52. On the box section 40 there is mounted tree gripping means 41 and on the boom a stripper delimber 31 along with a tree topping mechanism 32 if so desired. All of the foregoing components are conventional and typical of the Logma and/or Harricana machines presently sold and in use.

In accordance with the present invention and, as clearly seen from FIG. 2, the boom 30 and delimber means associated therewith are laterally off-set from the lever 50 and connected thereto by pivot means 53 so that the boom can be raised to an operative position and lowered to a transport position while the boom remains horizontal. Locking means are associated with pivot means 53 normally to prevent pivotal movement when the boom is in its raised operative position.

Figure 3:
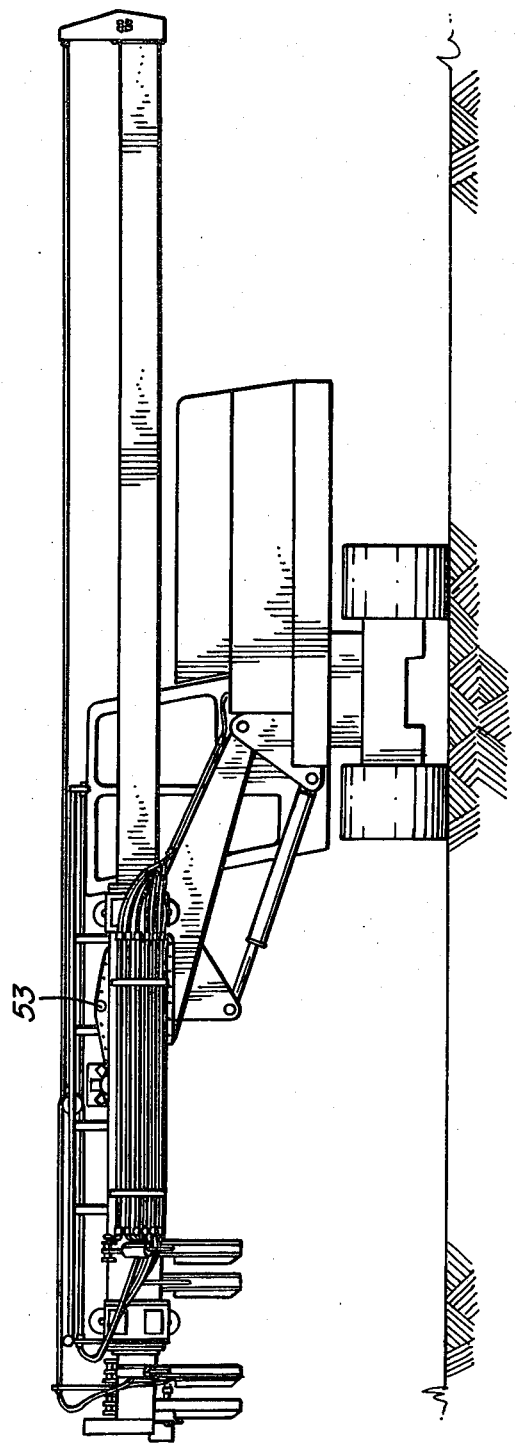
FIG. 3 is a side elevational view similar to FIG. 1 but illustrating the boom in its lowered transport position.

The boom mounting lever 50 is illustrated in FIGS. 4 to 6 inclusive and consists of respective first and second portions 54 and 55 disposed at right angles to one another. The first portion 54 has a sleeve 56 that receives the pivot pin 51 mounting the lever on the turntable 20. The portion 55 is at the upper end of portion 54 and consists of respective first and second portions 55A and 55B interconnected by a flange coupling 56 which incorporates therein bushings or bearings for pivot means 53. The flange coupling has a plurality of apertures 57 for receiving bolts to rigidly interconnect respective portions 55A and 55B preventing pivotal movement of the boom on the lever during normal operation of the machine. For lowering the boom, reducing overall height of the vehicle during transport, the bolts interconnecting the coupling portions are removed and the weight of the boom is carried then by pivot means 53. The boom box section 40 for the boom is rigidly attached as by welding or the like to the outer end of lever portion 55B. Hydraulic control means and/or other linkages may be utilized to retain the boom in a horizontal position while it is lowered and pivoting about pivot means 53. The lowered transport position is illustrated in FIG. 3 from which it will be seen the pivoted coupling with locking means substantially reduces the over-all height of the machine.

Figure 1:
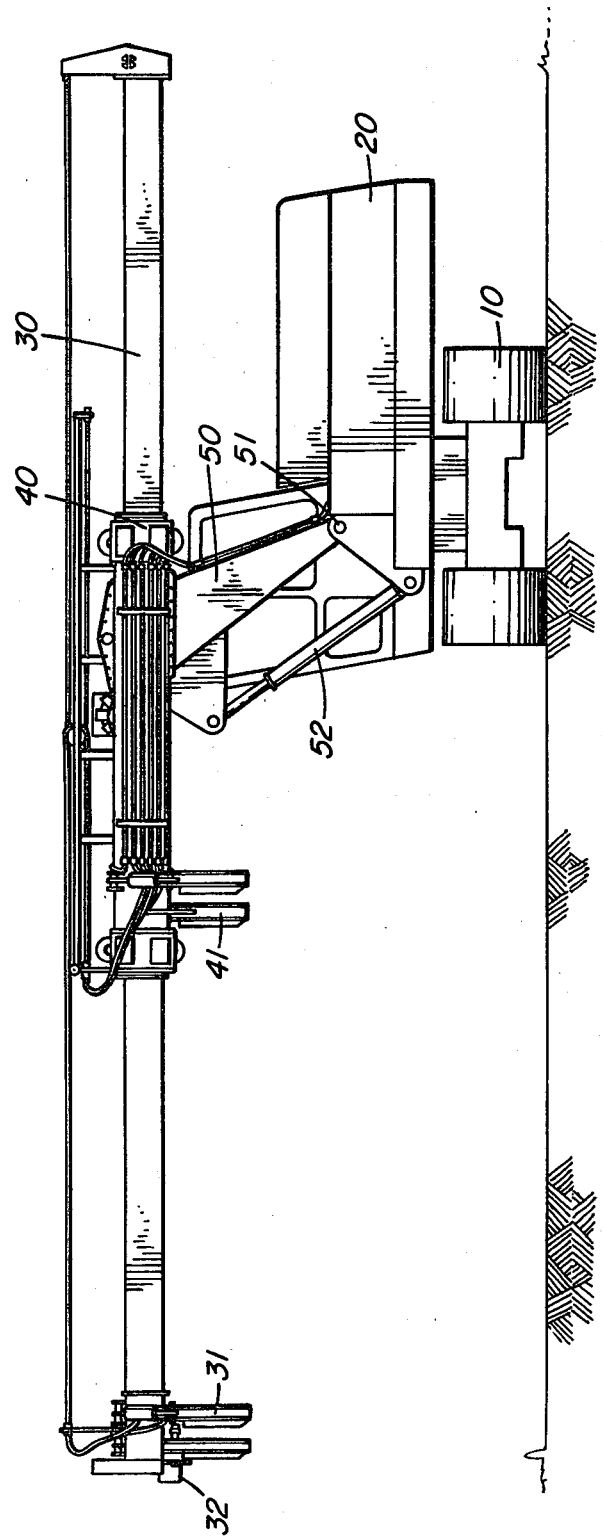
FIG. 1 is a side elevational view of a tree processor provided in accordance with the present invention with the boom in an operative raised position.

The lever illustrated in FIGS. 4-6 has the boom portion 55 laterally offset to the left from the lever portion 54 as would be viewed from the front of the machine when the hydraulic cylinders 52 are connected thereto by way of apertured bracket members 60. Alternatively, the boom illustrated in FIGS. 4-6 could be mounted on the machine illustrated in FIG. 1 with the boom offset towards the viewer and in which case the hydraulic cylinders 52 would be located behind the lever 50; i.e. to the right of lever 50 as viewed in FIG. 1. The particular arrangement is considered an immaterial detail, the main concept being that the boom is offset laterally from the point of low connection of the lever portion 54 to the rotary deck and wherein there is pivot and locking means in the laterally offset portion permitting raising and lowering the boom while the boom remains in a horizontal position.

I claim:

1. A tree processor comprising a mobile vehicle, a horizontally disposed extendible and retractable boom, a stripper delimber and tree gripping means mounted on the harvester and movable toward and away from one another during extension and retraction of the boom for removing limbs from trees during movement of the boom; and means mounting said boom on said vehicle, said means comprising a lever pivotally attached at first and second spaced apart positions respectively to said vehicle and to a fixed section of the boom about first and second parallel pivot axis so that the boom can be raised and lowered to respective operative and transport positions while the boom remains horizontal; lock means associated with said second pivotal connection preventing pivotal movement of the boom on the lever when said boom is in its raised operative position, said boom being in a vertical plane laterally off-set with respect to the position of said first pivot on said vehicle in a direction parallel to the pivot axis thereof; and power means for pivoting said lever about said first pivot axis.

2. A tree processor as defined in claim 1 wherein said extendible and retractable boom comprises a beam member reciprocally mounted in a box section, the latter providing said fixed section of the boom and wherein said lever, via said second pivot, is pivotally attached to said box section.

3. A tree processor as defined in claim 1 wherein said lever comprises a first vertically disposed portion and a second horizontally disposed portion at the upper end thereof, said second portion consisting of first and second parts pivotally interconnected by said second pivot means and positioned so that the second part is laterally offset from the boom in the direction of the pivot axis and wherein the boom is reciprocally mounted on the second part of said second portion of the lever.

4. A tree processor comprising a mobile vehicle, a boom reciprocally mounted in a box section, a stripper delimber and tree gripping means associated respectively with one or the other of said boom and box section for removing limbs from trees during reciprocal movement of the boom; and means mounting said box section on said vehicle, said means comprising a vertically disposed lever pivotally attached adjacent the lower end thereof at a first position to said vehicle and adjacent the upper end thereof at a second position to said box section for movement about first and second parallel pivot axis so that the boom can be raised and lowered to respective operative and transport positions while the boom remains horizontal; lock means associated with said second pivotal connection preventing pivotal movement of the boom on the lever when said boom is at least in its raised operative position, said boom being laterally off-set with respect to said first pivot position; and power means for pivoting said lever about said first pivot axis.

5. A device for mounting a boom on a mobile vehicle comprising: an elongate lever having first means on one end thereof for pivotally mounting the same on the vehicle, a boom mounting portion connected to the opposite end of said lever, said boom mounting portion comprising a first part rigidly secured to said opposite end of the lever and a second part, second means pivotally interconnecting said first and second parts for pivotal movement about an axis parallel to said first pivot means, each of said first and second parts having an outwardly directed flange extending around the periphery thereof and disposed in abutting relation, said flanges being boltable together thereby providing locking means selectively preventing pivotal movement of said second pivot means and means for mounting a boom on said second part at a position remote from said lever such that when a boom is mounted thereon it is laterally offset from the lever in a direction parallel to the pivot axis of said first and second pivot means.

6. In a tree harvester, a device for mounting the boom on a mobile vehicle comprising an elongate lever having first means on one end thereof for pivotally mounting the same on the vehicle and a boom mounting means pivotally connected to the opposite end thereof, the pivot axis of said first means and boom mounting means being parallel to one another, said boom mounting means being off-set laterally from said lever in the direction of the pivotal axis so that when a horizontal boom is attached thereto the boom is in a vertical plane off-set laterally from the lever whereby the boom can be raised and lowered on the vehicle respectively to an operative and road travelling position by pivoting the lever about said first pivot means and lock means for selectively preventing pivotal movement of the boom mounting means relative to said lever in at least the boom raised position.

* * * * *